Patented Aug. 22, 1933

1,923,769

UNITED STATES PATENT OFFICE 1,923,769

REFRACTORY MATERIAL FOR USE IN METAL CASTING

Charles D. Wood, Sr., Lakewood, Ohio, assignor to The Grasselli Chemical Company, Cleveland, Ohio, a Corporation of Delaware No Drawing. Application June 13, 1932
Serial No. 617,045

2 Claims. (Cl. 22—188)

The present invention relates to refractory materials such as used in connection with casting metals and particularly to refractories composed of sand agglomerated with a soluble silicate. Such refractories are used as linings of metallic containers which come in contact with molten metals, for casting molds, etc.

I have found that the addition of small amounts of a basic zinc compound, for instance zinc oxide, to the mixture of sand and soluble silicate, such as sodium or potassium silicate from which such refractories are formed, greatly improves certain properties of the refractory and my invention relates to a novel refractory containing a zinc compound and having improved resistance to moisture and high temperatures, its manufacturing and use.

Refractories made only of sand and a soluble silicate have the disadvantage of deteriorating and losing strength when stored in atmospheric moist air. They adsorb moisture and the bond between the silicate and the sand particles is weakened.

This disadvantage is overcome by my novel compositions. The zinc oxide or other basic zinc compound, such as zinc oxychloride, zinc oxysulfate, zinc carbonate, etc., reacts slowly with the soluble silicate to form what I believe is an additional waterproof bond between the sand particles themselves and between the particles and the soluble silicate. While I am unable to give a chemical explanation for this additional bond, I believe that it is important to form such a bond slowly, that is to say, mainly on baking the said silicate-sand-zinc compound composition, as with substances which react too fast or on which a complete bond is obtained before baking, no improved water resistance and strength is obtained.

The addition of a zinc compound to sodium silicate-sand compositions furthermore increases the resistance of the refractory to the molten metals, such as iron, with which it comes in contact in the course of its use. The properties of my novel refractories are such that they can be used many times without breaking and, while this might be a disadvantage in certain kinds of molds which have to be broken to remove the castings, this property constitutes a great saving in linings and other applications in operations of metal casting.

In preparing my novel refractories, I have followed for instance the following procedure:—
86 lbs. 40 mesh sand 1 lb. zinc oxide were mixed dry in a muller or edge roller mill until the zinc oxide was well distributed through the sand. I then poured in 11 lbs. of sodium silicate solution 42° Bé. ratio 3.25:1, $SiO_2:Na_2O$, and continued mixing for a few minutes; when required, a slight amount of water was added to reduce the mixture to the proper consistency where it could be transferred to a forming machine.

The mixture was then placed in a suitable ramming machine or other mold filling device where it was shaped to the desired form. The consistency of the mixture was such that it could immediately be removed therefrom without the binder having definitely set. The shaped body was then placed in an oven and heated by indirect heat out of contact with $CO_2$ for about 1-2 hours to about 400° F. The baked refractory is then annealed and is ready for use.

The amounts of ingredients can be varied within certain limits, preferably as follows:

The composition of the silicate should be within the limits of $SiO_2:Na_2O$ of 2:1 to 3.6:1. The concentration of the silicate should not be less than 40° Bé.; with more concentrated solutions I use some additional water to bring the mix to the required consistency. The amounts of silicate should be within about 3 to 7 pounds of silicate solids per 100 pounds of total wet mix. The amount of zinc compound can be varied between one-half to 5% with best results having been obtained with 1%. Small amounts, for instance one-half per cent of coloring oxides, such as $Fe_2O_3$, $Cr_2O_3$ can be added to give the refractory a distinctive color. Such oxides do not seem to interfere with the action of the zinc oxide or otherwise influence the properties of the refractory. The baking temperature can, of course, be varied above 400° F. though this is a convenient temperature which follows usual practice in making refractories of this type. It is also possible to incorporate the zinc compound with the silicate before mixing with the sand. In this case, however, it is important to use such mixtures before the zinc oxide has actually reacted with the silicate. In every instance it is important to see that this reaction takes place slowly.

As prepared in this manner, a refractory has initial strength, at least the same and usually greater than a similar composition made without the zinc compound. After storing for three months in a moist atmosphere, the strength of a refractory free from the zinc compound has considerably decreased, while a refractory made according to my novel process has from 3 to 4 times the strength of the zinc-free product.

My novel refractories are sufficiently porous to allow of the escape of gas when in contact with molten metals such as iron. Due to this property and the increased strength and moisture resistance, my products are particularly adapted for use as linings, molds, etc., which come in contact with the molten metal in casting operations.

I claim:

1. In a process of casting metals, the step of bringing the molten metal in contact with a porous refractory composed of sand, a soluble silicate and the reaction product obtained in situ during baking when mixing a small amount of a basic zinc compound with the sand and silicate and baking the mixture.

2. In a process of casting ferrous metals, the step of bringing the molten metal in contact with a porous refractory composed of sand, sodium silicate and the reaction product obtained in situ during baking when mixing 1% zinc oxide with the sand and the silicate and baking the mixture.

CHARLES D. WOOD, Sr.